United States Patent
Nimura et al.

(10) Patent No.: US 11,654,713 B2
(45) Date of Patent: May 23, 2023

(54) SPOKE WHEEL

(71) Applicant: HONDA MOTOR CO., LTD., Tokyo (JP)

(72) Inventors: Taisuke Nimura, Tokyo (JP); Kazuhiko Gogo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

(21) Appl. No.: 16/866,852

(22) Filed: May 5, 2020

(65) Prior Publication Data

US 2020/0361235 A1 Nov. 19, 2020

(30) Foreign Application Priority Data

May 15, 2019 (JP) .............................. JP2019-092122

(51) Int. Cl.
*B60B 21/02* (2006.01)
*B60B 1/02* (2006.01)
*B60B 21/06* (2006.01)
*B60C 29/02* (2006.01)

(52) U.S. Cl.
CPC .............. *B60B 1/02* (2013.01); *B60B 21/026* (2013.01); *B60B 21/06* (2013.01); *B60B 21/064* (2013.01); *B60B 2310/214* (2013.01); *B60B 2310/226* (2013.01); *B60C 29/02* (2013.01)

(58) Field of Classification Search
CPC ..... B60B 21/064; B60B 21/02; B60B 21/026; B60B 1/02; B60B 21/06
See application file for complete search history.

(56) References Cited

U.S. PATENT DOCUMENTS

| | | | | |
|---|---|---|---|---|
| 4,398,770 A * | 8/1983 | Smith | ....................... | B60B 7/18 301/37.29 |
| 6,145,937 A * | 11/2000 | Chen | ..................... | B60B 21/062 301/58 |
| 6,367,883 B1 * | 4/2002 | Chen | ..................... | B60B 21/066 301/58 |
| 7,597,404 B2 * | 10/2009 | Fuse | ....................... | B60B 1/048 301/58 |
| 2010/0090520 A1 * | 4/2010 | Kamiyama | ........... | B60B 21/028 301/95.104 |

(Continued)

FOREIGN PATENT DOCUMENTS

| | | |
|---|---|---|
| CN | 206826313 U | 1/2018 |
| DE | 100 12 325 C1 | 8/2001 |
| DE | 602 07 005 T2 | 7/2006 |

(Continued)

OTHER PUBLICATIONS

German Office Action with English translation dated Sep. 27, 2021, 7 pages.

(Continued)

*Primary Examiner* — Scott A Browne
(74) *Attorney, Agent, or Firm* — Rankin, Hill & Clark LLP (57) ABSTRACT

In a spoke wheel that includes: a rim; a hub; and a plurality of spokes connecting the rim with the hub, the spokes each having an end portion connected with a connection portion disposed at a lateral surface portion on an outside in a width direction of the rim, the rim includes a raised portion that is raised from the connection portion to the outside in the width direction.

11 Claims, 9 Drawing Sheets

(56) References Cited

U.S. PATENT DOCUMENTS

2020/0062032 A1* 2/2020 Yamamoto .............. B60B 21/06

FOREIGN PATENT DOCUMENTS

| DE | 10 2009003636 B3 | 1/2010 |
| DE | 10 2014200542 A1 | 7/2015 |
| EP | 1 428 685 A2 | 6/2004 |
| EP | 1 604 838 A2 | 12/2005 |
| JP | H08-188002 A | 7/1996 |
| JP | 2000-6601 | 1/2000 |
| JP | 2005-349857 A | 12/2005 |
| JP | 2007-326384 A | 12/2007 |

OTHER PUBLICATIONS

Japanese Office Action dated Jul. 12, 2022 issued in corresponding Japanese Application No. 2019-092122; English machine translation included (9 pages).
German Search Report dated Jan. 25, 2021, English translation included, 13 pages.
Chinese Office Action corresponding to Application No. 202010343226.7, dated Dec. 23, 2022, 6 pages.

* cited by examiner

FIG.9

# SPOKE WHEEL

INCORPORATION BY REFERENCE

The present application claims priority under 35 U.S.C. § 119 to Japanese Patent Application No. 2019-092122 filed on May 15, 2019. The content of the application is incorporated herein by reference in its entirety.

TECHNICAL FIELD

The present invention relates to a spoke wheel.

BACKGROUND ART

A hitherto known spoke wheel includes a rim, a hub, and a plurality of spokes connecting the rim with the hub and has end portions of the spokes connected with connection portions provided at outer side surface portions in a width direction of the rim (see, for example, Patent Document 1).

PRIOR ART DOCUMENT

Patent Document

[Patent Document 1]
Japanese Patent Laid-Open No. 2000-6601

SUMMARY OF THE INVENTION

Problem to be Solved by the Invention

Such a spoke wheel is preferably light in weight as long as the spoke wheel maintains required stiffness.

The present invention has been made in view of the foregoing situation and it is an object of the present invention to achieve, in a spoke wheel, reduction in weight, while ensuring required stiffness.

Means for Solving the Problem

To achieve the foregoing object, an aspect of the present invention provides a spoke wheel that includes a rim (12); a hub (13); and a plurality of spokes (14) connecting the rim (12) with the hub (13), the spokes (14) each having an end portion (14a) connected with a connection portion (22, 222, 322) disposed at a lateral surface portion (28) on an outside in a width direction of the rim (12). In the spoke wheel, the rim (12) includes a raised portion (30, 230, 330) that is raised from the connection portion (22, 222, 322) to the outside in the width direction.

In the foregoing configuration, preferably, the raised portion (30, 230, 330) is disposed radially about the hub (13).

In the foregoing configuration, preferably, the raised portion (30, 230, 330) is a quadrilateral in a side view.

In the foregoing configuration, preferably, the raised portion (230) is an isosceles trapezoid having, in the quadrilateral, a side (230b) on an outside in a radial direction of the rim (12) longer in length than a side (230c) on an inside in the radial direction of the rim (12).

In the foregoing configuration, preferably, the rim (12) includes a circular ring-shaped connection wall portion (340) connecting together the raised portions (330) in a circumferential direction of the rim (12), and the connection wall portion (340) extends along recessed portions (331), each being formed between a corresponding pair of adjacent raised portions (330).

In the foregoing configuration, preferably, the connection wall portion (340) is flush with the raised portion (330) in a height direction of the raised portion (330).

In the foregoing configuration, preferably, the raised portion (30, 230, 330) is formed by subjecting the lateral surface portion (28) of the rim (12) to a cutting operation, and the recessed portions (31, 231, 331, 431), each being formed between a corresponding pair of adjacent raised portions (30, 230, 330), are cut surfaces formed by the cutting operation.

In the foregoing configuration, preferably, an end face (30a, 230a, 330a) in a height direction of each of the raised portions (30, 230, 330) is subjected to surface treatment resulting in an appearance different from an appearance resulting from surface treatment applied to each of the recessed portions (31, 231, 331, 431) formed between a corresponding pair of adjacent raised portions (30, 230, 330).

In the foregoing configuration, preferably, the spoke wheel is a tubeless wheel including an air valve (23), the rim (12) is metal extruded stock formed into a circular ring shape, the rim (12) has a valve hole (34) in which the air valve (23) is fixed, and the valve hole (34) is disposed in a shouldered portion (33) formed by pressing in a part of the rim (12) in the circumferential direction of the rim (12).

In the foregoing configuration, preferably, the spokes each have the end portion (14a) fitting in a support hole (29) extending in the radial direction of the rim (12) at the connection portion (22), and the recessed portions (431) each formed between a corresponding pair of adjacent raised portions (30) overlaps at least partly the support hole (29) in a depth direction of the recessed portions (431).

Effects of the Invention

The spoke wheel includes the rim, the hub, and the spokes that connect the rim with the hub. The spokes each have the end portion connected with the connection portion disposed at the lateral surface portion on the outside in the width direction of the rim. The rim includes the raised portion that is raised from the connection portion to the outside in the width direction.

Through the foregoing configuration, the raised portion is provided at the connection portion, with which the end portion of the spoke is connected, so that the connection portion can achieve required stiffness and the rim can be reduced in weight at portions between each pair of the raised portions. Thus, the spoke wheel can achieve reduction in weight while ensuring the required stiffness.

In the foregoing configuration, the raised portion may be disposed radially about the hub.

Through the foregoing configuration, stiffness of the rim can be well-balanced along the circumferential direction of the rim.

In the foregoing configuration, the raised portion may be a quadrilateral in a side view.

This configuration enables the raised portion to be formed easily.

In the foregoing configuration, in the quadrilateral, the raised portion may be an isosceles trapezoid in which the side on the outside in the radial direction of the rim is longer in length than the side on the inside in the radial direction of the rim.

Through the foregoing configuration, the rim can efficiently be reduced in weight while stiffness of the rim is ensured.

In the foregoing configuration, the rim may include the circular ring-shaped connection wall portion that connects together the raised portions in the circumferential direction of the rim and the connection wall portion may extend along the recessed portion formed between two adjacent raised portions.

Through the foregoing configuration, the connection wall portion can enhance stiffness of the rim.

In the foregoing configuration, the connection wall portion may be flush with the raised portion in the height direction of the raised portion.

Through the foregoing configuration, the raised portion and the connection wall portion can be formed easily and, even with a configuration including the raised portion, the connection wall portion can be used to easily measure runout of the rim.

In the foregoing configuration, the raised portion may be formed by subjecting the lateral surface portion of the rim to a cutting operation, and the recessed portions, each being formed between two adjacent raised portions, may be cut surfaces formed by the cutting operation.

Through the foregoing configuration, the raised portion can easily be formed by the cutting operation and a surface giving a high-quality feel of the cut surface can be provided on the lateral surface portion of the rim.

In the foregoing configuration, the end face in the height direction of the raised portion may be subjected to surface treatment resulting in an appearance different from an appearance resulting from surface treatment applied to each of the recessed portions formed between two adjacent raised portions.

Through the foregoing configuration, the surface treatment applied to the raised portion can enhance appearance of the spoke wheel.

In the foregoing configuration, the spoke wheel may be a tubeless wheel including the air valve, the rim may be metal extruded stock formed into a circular ring shape, the rim may have the valve hole in which the air valve is fixed, and the valve hole may be disposed in the shouldered portion formed by pressworking in a part of the rim in the circumferential direction.

Through the foregoing configuration, because the air valve is fixed to the shouldered portion that is formed in the circumferential direction of the rim by pressworking in a part of the rim formed of the extruded stock, the shouldered portion can be small in the circumferential direction of the rim and the rim can be reduced in weight.

In the foregoing configuration, the end portion of the spoke may fit in the support hole that extends in the radial direction of the rim at the connection portion and the recessed portion formed between two adjacent raised portions may overlap at least partly the support hole in the depth direction of the recessed portion.

Through the foregoing configuration, the recessed portion has a depth with which the recessed portion overlaps the support hole, in which the end portion of the spoke fits, so that the recessed portion can effectively reduce weight of the rim.

MODES FOR CARRYING OUT THE INVENTION

Embodiments of the present invention will be described below with reference to the accompanying drawings.

First Embodiment

Figure 1:
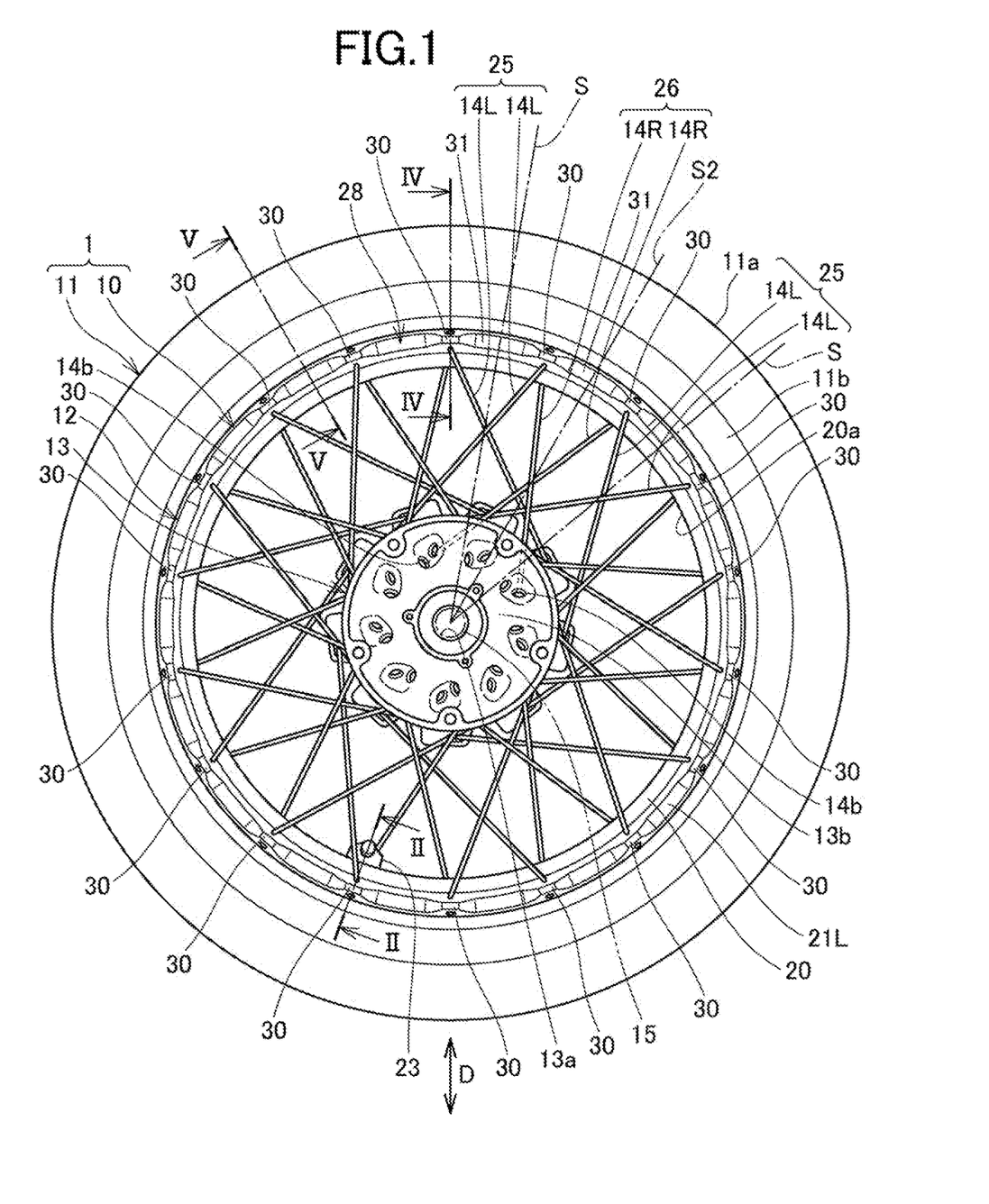
FIG. 1 is a side elevational view of a wheel according to a first embodiment of the present invention.

FIG. 1 is a side elevational view of a wheel 1 according to a first embodiment of the present invention.

The wheel 1 is mounted in a saddle riding vehicle, such as a motorcycle.

The wheel 1 includes a spoke wheel 10 and a tire 11. The spoke wheel 10 is mounted on a vehicle body of the saddle riding vehicle. The tire 11 is supported by the spoke wheel 10.

The spoke wheel 10 includes a rim 12, a hub 13, and a plurality of spokes 14. The rim 12 is circular ring-shaped in a side view. The hub 13 is disposed at a center of the rim 12. The spokes 14 connect the rim 12 with the hub 13.

It is noted that the following descriptions may refer to arrows used in the drawings to denote specific directions as detailed in the following: an arrow R denotes a circumferential direction (rotating direction) of the rim 12, an arrow D denotes a radial direction of the rim 12, and an arrow W denotes a width direction of the rim 12.

The hub 13 is a tubular member extending in a vehicle width direction (left-right direction) of the saddle riding vehicle. The hub 13 has an axle hole 13a, through which an axle 15 of the saddle riding vehicle is passed. The wheel 1 rotates about the axle 15.

Figure 2:
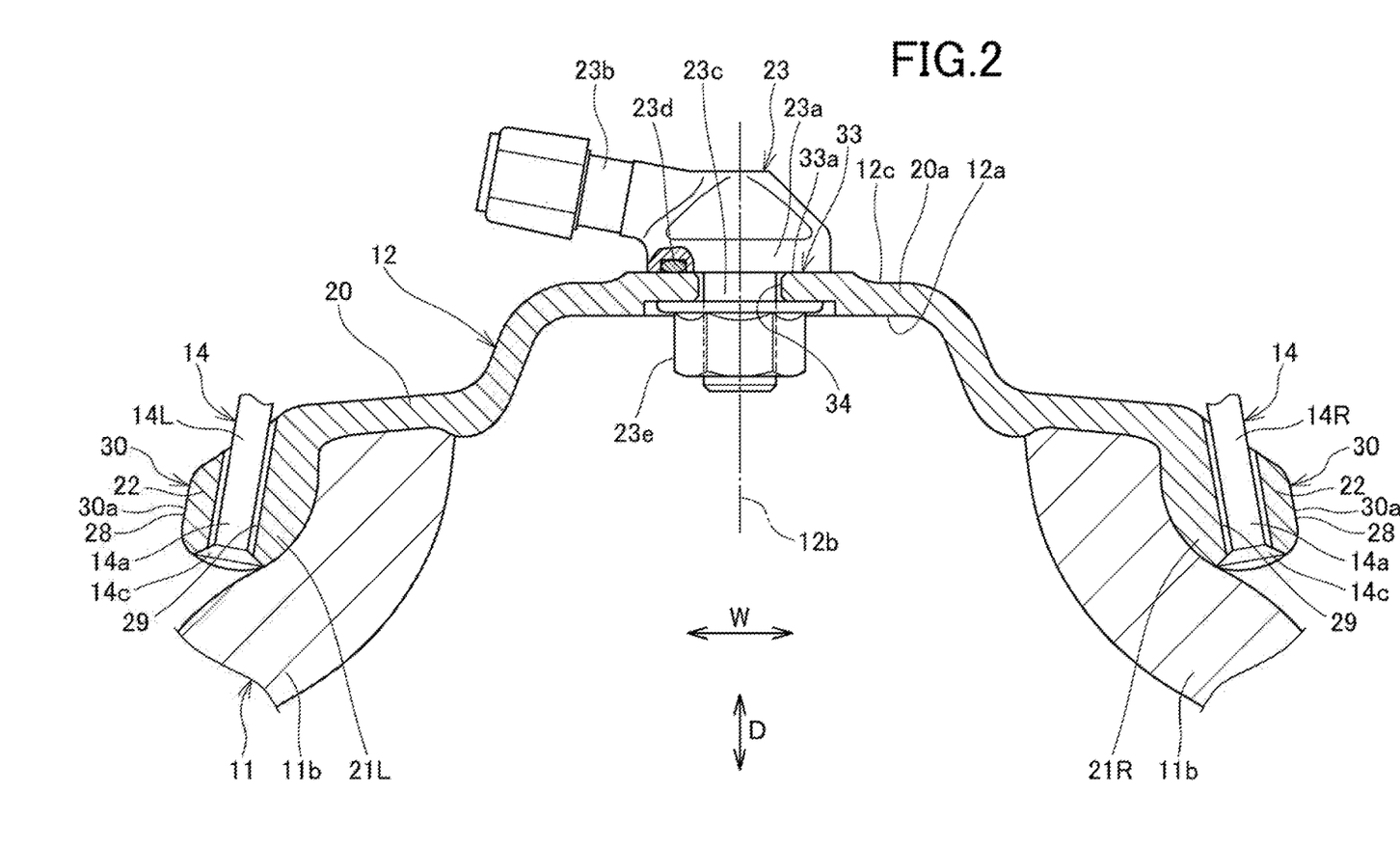
FIG. 2 is a cross-sectional view taken along II-II in FIG. 1.

FIG. 2 is a cross-sectional view taken along II-II in FIG. 1.

Reference is made to FIGS. 1 and 2. The rim 12 includes a bottom wall portion 20 and a pair of left and right flange portions 21L and 21R. The bottom wall portion 20 has a circular ring shape surrounding the hub 13 from a periphery. The flange portions 21L and 21R rise to an outside in the radial direction of the rim 12 from both lateral edges in a width direction of the bottom wall portion 20.

In the cross-sectional view of FIG. 2, the bottom wall portion 20 has a plate shape extending in the width direction of the spoke wheel 10. The bottom wall portion 20 includes a bulged portion 20a at a central portion in the width direction. The bulged portion 20a represents a portion of the plate shape of the bottom wall portion 20 recessed inside in the radial direction. The spoke wheel 10 has the width direction coinciding with the vehicle width direction.

The bulged portion 20a and the flange portions 21L and 21R are provided throughout an entire periphery of the rim 12.

A connection portion 22 is provided for each of the left and right flange portions 21L and 21R. The spokes 14 are connected to the connection portions 22.

The tire 11 includes a tread portion 11a and a pair of left and right lateral wall portions 11b. The tread portion 11a constitutes an outer peripheral surface of the tire 11, contacting a road surface. The lateral wall portions 11b rise to an inside in the radial direction from both lateral edges in the width direction of the tread portion 11a.

The tire 11 is supported by the rim 12 by the left and right lateral wall portions 11b having distal end portions abutting against the bottom wall portion 20 and inner surfaces of the left and right flange portions 21L and 21R.

The spoke wheel 10 is a tubeless wheel requiring no tire tube inside the tire 11. The spoke wheel 10 includes an air valve 23 at the rim 12.

Air inflating the tire 11 is directly charged in a space inside the tire 11 via the air valve 23 and hermetically sealed between an inner surface of the tire 11 and an outer peripheral surface 12a of the rim 12.

Figure 3:
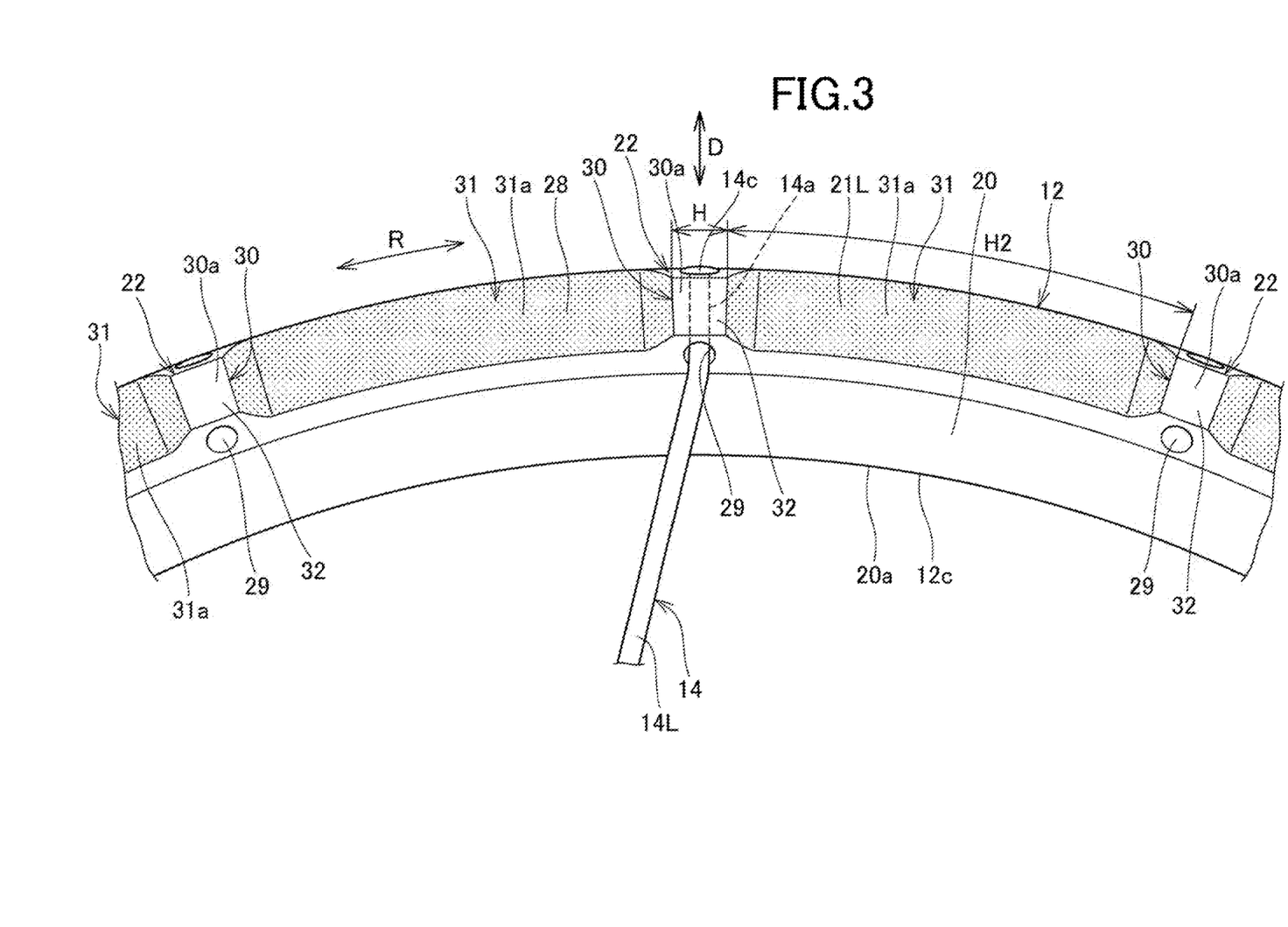
FIG. 3 is a side elevational view of a spoke and a connection portion in a rim.

FIG. 3 is a side elevational view of the spoke 14 and the connection portion 22 in the rim 12. It is noted that FIG. 3 depicts only one spoke 14.

Reference is made to FIGS. 1 to 3. The spoke 14 is a metal wire spoke formed of a wire rod.

The spoke 14 has a wire shape including a first end portion 14a (end portion) and a second end portion 14b. The first end portion 14a is connected with the rim 12. The second end portion 14b is connected with the hub 13.

More specifically, the spoke 14 includes a first side spoke 14L and a second side spoke 14R. The first side spoke 14L has the first end portion 14a connected with the connection portion 22 on a first flange portion 21L. The second side spoke 14R has the first end portion 14a connected with the connection portion 22 on a second flange portion 21R.

FIG. 1 depicts a straight line S, which passes through a center of the hub 13 in a side view. The first side spoke 14L is disposed as detailed in the following. Specifically, a spoke pair 25, which includes a pair of first side spokes 14L disposed so as to cross each other on the straight line S, is provided in plurality and the spoke pairs 25 are spaced equidistantly apart from each other along a circumferential direction of the spoke wheel 10. Specifically, each of the first side spokes 14L is disposed slantwise with respect to the radial direction of the spoke wheel 10 in a side view.

Additionally, the first side spoke 14L extends from the connection portion 22 of the first flange portion 21L toward the hub 13 across a centerline 12b (FIG. 2) in the width direction of the rim 12 and has a second end portion (not depicted) connected with a second lateral surface in the width direction of the hub 13.

FIG. 1 depicts a straight line S2, which passes through the center of the hub 13 in a side view. The straight line S2 is disposed midway between a pair of straight lines S, which are adjacent to each other.

The second side spoke 14R is disposed as detailed in the following. Specifically, a spoke pair 26, which includes a pair of second side spokes 14R disposed so as to cross each other on the straight line S2, is provided in plurality and the spoke pairs 26 are spaced equidistantly apart from each other along the circumferential direction of the spoke wheel 10. Specifically, each of the second side spokes 14R is disposed slantwise with respect to the radial direction of the spoke wheel 10 in a side view.

Additionally, the second side spoke 14R extends from the connection portion 22 of the second flange portion 21R toward the hub 13 across the centerline 12b (FIG. 2) in the width direction of the rim 12 and has the second end portion 14b connected with a first lateral surface 13b in the width direction of the hub 13.

The connection portion 22, with which the first end portion 14a of the spoke 14 is connected, is provided similarly on the left and right flange portions 21L and 21R. The following describes a configuration on the side of the flange portion 21L.

Figure 4:
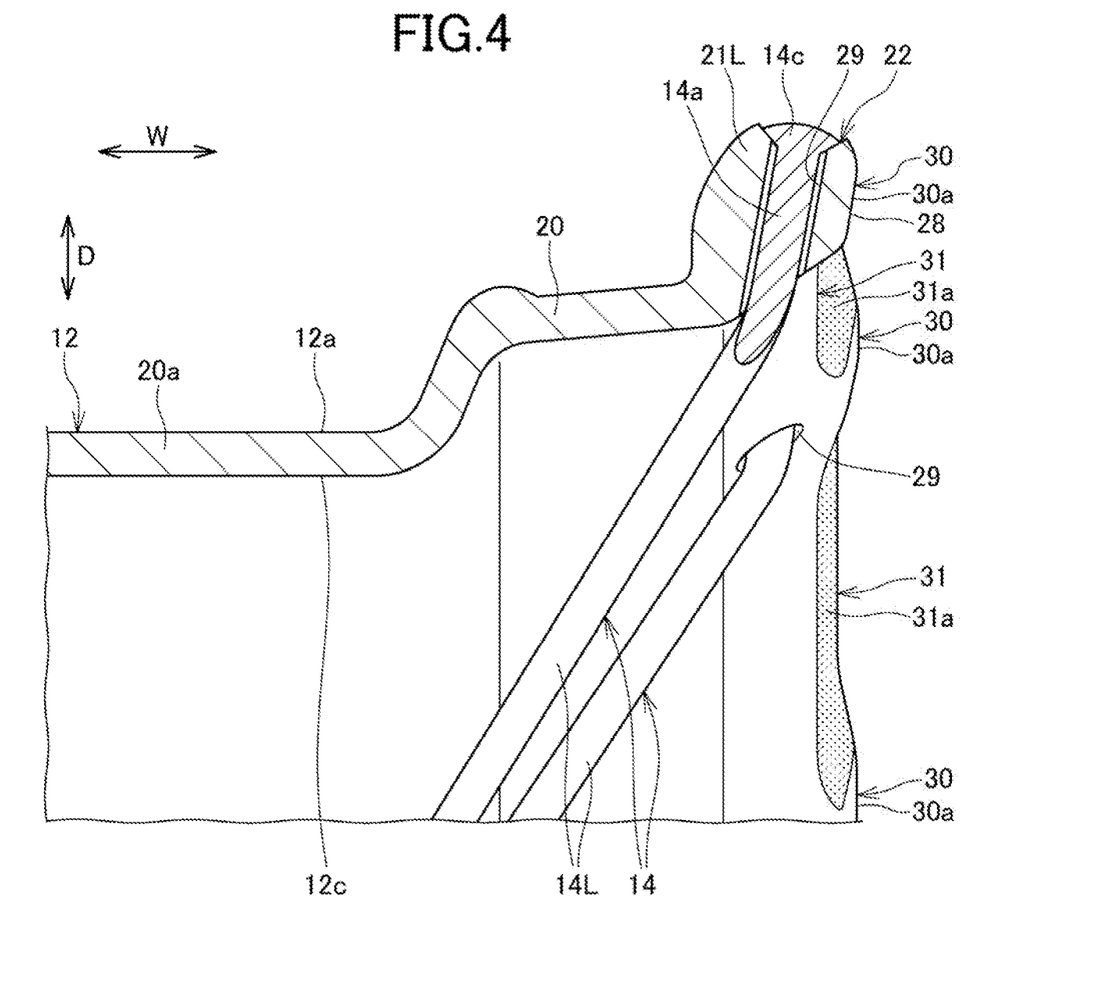
FIG. 4 is a cross-sectional view taken along IV-IV in FIG. 1.
Figure 5:
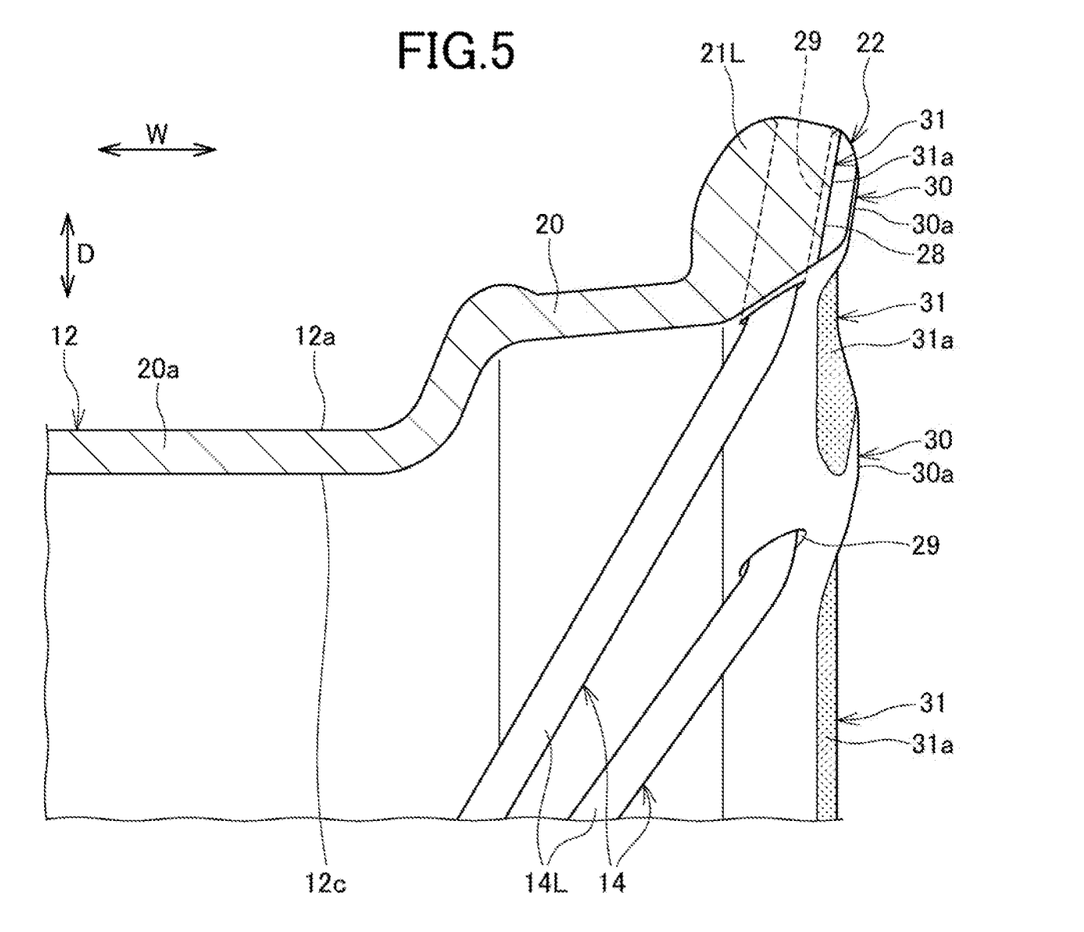
FIG. 5 is a cross-sectional view taken along V-V in FIG. 1.

FIG. 4 is a cross-sectional view taken along IV-IV in FIG. 1. FIG. 5 is a cross-sectional view taken along V-V in FIG. 1.

Reference is made to FIGS. 1 to 5. The connection portion 22 is disposed at a lateral surface portion 28 outside the flange portion 21L in the vehicle width direction and located outside in the width direction with respect to the lateral wall portion 11b of the tire 11. The connection portion 22 is provided in plurality and the connection portions 22 are spaced equidistantly apart from each other along a circumferential direction of the rim 12. The connection portions 22 are disposed in the same number as that of the first side spokes 14L.

Each of the connection portions 22 has a support hole 29, which passes through the flange portion 21L in the radial direction of the rim 12. The lateral surface portion 28 of the flange portion 21L is an inclined surface that is inclined such that the lateral surface portion 28 is disposed further outside in the width direction toward the outside in the radial direction of the rim 12. The support hole 29 is also inclined so as to extend along the lateral surface portion 28.

The spoke 14 is connected with the connection portion 22 by the first end portion 14a fitting in the support hole 29. More specifically, the first end portion 14a of the spoke 14 has a flange portion 14c formed at a distal end thereof. The flange portion 14c has a diameter greater than a diameter of the support hole 29. The spoke 14 is passed through the support hole 29 from the outside in the radial direction, so that the flange portion 14c abuts on an end face of the connection portion 22 on the outside in the radial direction. Tightening a nut disposed at the second end portion 14b on the side of the hub 13 causes the spoke 14 to pull the rim 12 toward the side of the hub 13 via the flange portion 14c. Specifically, the connection portion 22 bears tension of the spoke 14.

In the spoke wheel 10, because the support hole 29 is disposed outside the tire 11, air inside the tire 11 does not leak to the outside through the support hole 29. The spoke wheel 10 can thus be adapted to the tubeless type.

The rim 12 includes a raised portion 30. The raised portion 30 is raised in the lateral surface portion 28 to the outside in the width direction of the rim 12 from each of the connection portions 22.

The raised portions 30 are radially disposed about the hub 13 equidistantly along the circumferential direction of the rim 12.

An outer lateral surface 30a, which constitutes an end face in a height direction of the raised portion 30, is a quadrilateral in the side view of FIG. 3. The outer lateral surface 30a is a rectangle extending in the radial direction of the rim 12 in the side view and having a side longer in the radial direction than a side extending in the circumferential direction of the rim 12. The raised portion 30 has a width in the circumferential direction of the rim 12 greater on a proximal end side of the raised portion 30 and gradually decreasing toward the side of the outer lateral surface 30a. In the side view, the support hole 29 and the flange portion 14c each fall within a width H of the outer lateral surface 30a of the raised portion 30.

Providing the raised portion 30 results in a recessed portion 31 being formed in the lateral surface portion 28 of the flange portion 21L of the rim 12 between two adjacent raised portions 30. The recessed portion 31 is recessed in the width direction of the rim 12. The recessed portion 31 is provided in plurality and the recessed portions 31 are spaced equidistantly apart from each other along the circumferential direction of the rim 12. In the circumferential direction of the rim 12, the recessed portion 31 has a width H2 greater than the width H of the outer lateral surface 30a of the raised portion 30. In the descriptions that follow, the recessed portion 31 is shaded by dots in the relevant drawings for easier identification of the recessed portion 31 in the drawings.

As depicted in FIG. 5, the recessed portion 31 has a bottom surface 31a disposed outside the support hole 29 in the width direction of the rim 12. In a depth direction of the recessed portion 31, the recessed portion 31 does not overlap the support hole 29.

The bottom surface 31a of the recessed portion 31 and the outer lateral surface 30a of the raised portion 30 are the lateral surface portion 28 of the flange portion 21L and an inclined surface that is inclined such that the bottom surface 31a and the outer lateral surface 30a are located more on the outside in the width direction toward the outside in the radial direction of the rim 12. The recessed portion 31 and the raised portion 30 are provided over a substantially entire length of the lateral surface portion 28 in the radial direction of the rim 12.

In the spoke wheel 10, the raised portion 30 is provided at the connection portion 22, with which the first end portion 14a of the spoke 14 is connected, so that the raised portion 30 can enhance stiffness of the connection portion 22. Additionally, because a portion between the raised portions 30, which are disposed along the circumferential direction in the lateral surface portion 28, serves as the recessed portion 31, the recessed portion 31 achieves a thinning effect, so that the rim 12 can be reduced in weight.

Furthermore, providing the recessed portions 31 increases portions of the rim 12 having a small width. Thus, an object is less likely to hit against the rim 12 and the rim 12 can be prevented from being damaged.

The rim 12 is formed by bending long extruded stock having a cross section as depicted in FIG. 2 into a circular ring shape and joining both ends in a longitudinal direction of the extruded stock to thereby yield an annular body. The rim 12 is formed of metal and, in the present embodiment, formed of an aluminum alloy.

The raised portion 30 and the recessed portion 31 are formed by cutting the lateral surface portion 28 of the rim 12. Specifically, the recessed portion 31 is a cut surface and, when the spoke wheel 10 is viewed from the outside, traces of cutting tell that the recessed portion 31 has been formed by cutting.

The raised portion 30 and the recessed portion 31, including other cutting portions of the rim 12, are machined by, for example, a five-axis cutting machine through a single setup.

The outer lateral surface 30a of the raised portion 30 is subjected to surface treatment such that an appearance of the outer lateral surface 30a is different from an appearance of the recessed portion 31.

More specifically, alumite treatment is applied as the surface treatment to the outer lateral surface 30a. The alumite treatment forms a colored portion 32, which is colored in a color different from the recessed portion 31.

The surface treatment of the outer lateral surface 30a is performed as follows. First, the lateral surface portion 28 of the flange portion 21L is generally subjected to the alumite treatment. When the cutting operation to form the recessed portion 31 is thereafter performed, portions of the recessed portion 31 subjected to the alumite treatment are removed and a portion subjected to the alumite treatment is left on the outer lateral surface 30a. The outer lateral surface 30a is thereby colored easily with high accuracy.

Reference is made to FIGS. 1 and 2. The air valve 23 is provided at the bulged portion 20a in an inner peripheral surface 12c of the rim 12.

The bulged portion 20a includes a shouldered portion 33 and has a valve hole 34. The shouldered portion 33 protrudes to the inside in the radial direction of the rim 12. The valve hole 34 passes through the shouldered portion 33.

The air valve 23 includes a base 23a, a collar 23b, a tube 23c, a sealing member 23d, and a nut 23e. The base 23a is fixed to the shouldered portion 33 in the inner peripheral surface 12c. The collar 23b extends from the base 23a to the outside in the width direction. The tube 23c extends from the base 23a to the inside of the tire 11. The sealing member 23d is disposed between the base 23a and the shouldered portion 33. The nut 23e is fastened to a threaded portion on an outer peripheral portion of the tube 23c.

The air valve 23 is fastened to the shouldered portion 33 as follows. Specifically, the tube 23c is inserted in the valve hole 34 and the nut 23e is tightened on the back side of the base 23a in the shouldered portion 33.

The collar 23b communicates with the tube 23c and air supplied via an air inlet (not depicted) connected with the collar 23b is charged through the tube 23c into the tire 11.

Figure 6:
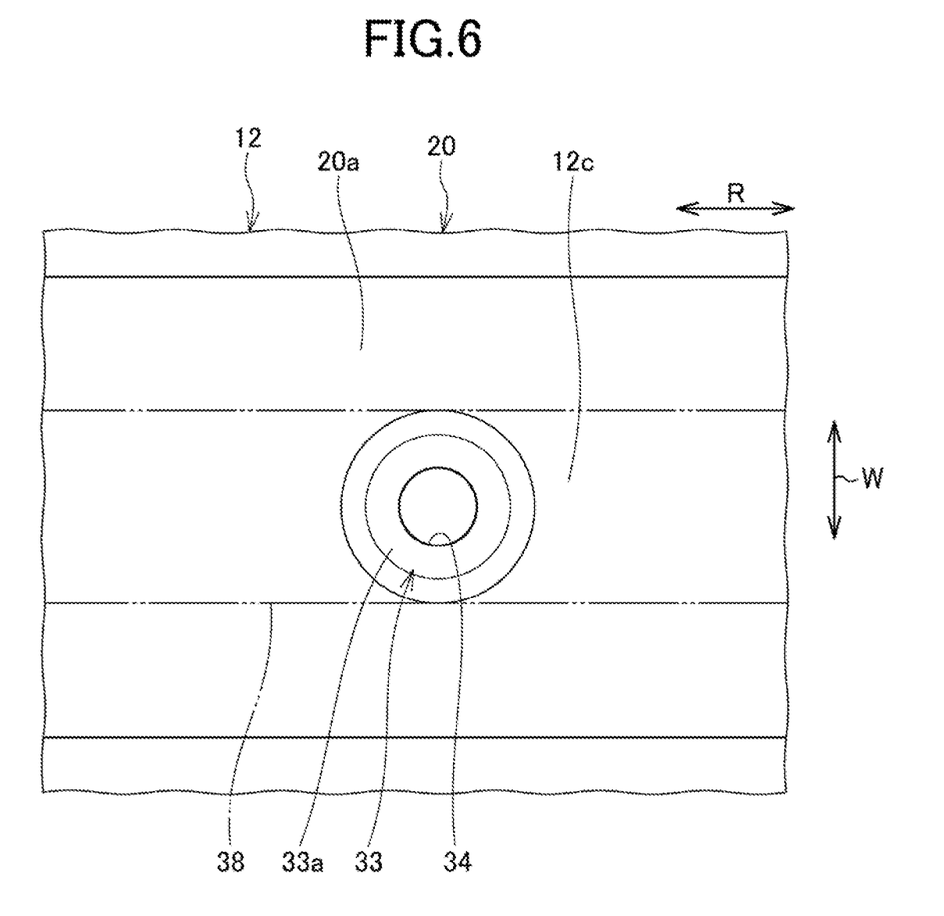
FIG. 6 is a plan view of a shouldered portion of the rim as viewed from a hub side.

FIG. 6 is a plan view of the shouldered portion 33 of the rim 12 as viewed from the side of the hub 13.

Reference is made to FIGS. 2 and 6. The shouldered portion 33 is a circular protrusion in a plan view and disposed at a central portion in the width direction of the rim 12. The valve hole 34 is disposed at a center in the shouldered portion 33.

An upper surface of the shouldered portion 33 constitutes a seating surface 33a, which bears the base 23a of the air valve 23 via the sealing member 23d. The seating surface 33a is a flat surface. The foregoing configuration enables adhesion between the base 23a and the seating surface 33a via the sealing member 23d to be enhanced, so that air pressure inside the tire 11 can be maintained at a high level over an extended period of time.

The shouldered portion 33 is formed by pressworking the bottom wall portion 20 of the rim 12 with a press machine. The shouldered portion 33 is formed such that the bottom wall portion 20 is pressed from the side of the outer peripheral surface 12a toward the side of the inner peripheral surface 12c. As such, because the seating surface 33a of the shouldered portion 33 is a flat surface that has been subjected to pressing, close tolerance flatness can be obtained and the adhesion between the base 23a and the seating surface 33a can be enhanced.

Additionally, the shouldered portion 33, which represents a part of the bottom wall portion 20 being protruded in the radial direction by the pressing, does not affect weight of the rim 12. Thus, the rim 12 can be built with a reduced weight.

Another possible method for forming a flat seating surface for the base 23a is to provide, in the inner peripheral surface 12c of the bottom wall portion 20, for example, a protruding portion 38 that extends all the way around the inner peripheral surface 12c as indicated by the imaginary line in FIG. 6, and to cut a part of the protruding portion 38. Because the rim 12 is formed of extruded stock, the protruding portion 38 is provided throughout the entire periphery of the inner peripheral surface 12c. In this case, the weight of the rim 12 increases due to the protruding portion 38 left after the seating surface has been formed.

As described above, according to the first embodiment to which the present invention is applied, the spoke wheel 10 includes the rim 12, the hub 13, and the spokes 14, which connect the rim 12 with the hub 13. The spokes 14 each have the first end portion 14a connected with the connection portion 22, which is disposed at the lateral surface portion 28 on the outside in the width direction of the rim 12. The rim 12 includes the raised portion 30 that is raised from the connection portion 22 to the outside in the width direction.

Through the foregoing configuration, the raised portion 30 is provided at the connection portion 22, with which the first end portion 14a of the spoke 14 is connected, so that the connection portion 22 can achieve required stiffness and the rim 12 can be reduced in weight at portions between each pair of the raised portions 30. Thus, the spoke wheel 10 can achieve reduction in weight, while ensuring the required stiffness.

The raised portion 30 is disposed radially about the hub 13.

Through the foregoing configuration, the stiffness of the rim 12 can be well-balanced along the circumferential direction of the rim 12.

The raised portion 30 is a quadrilateral in a side view. This configuration enables the raised portion 30 to be formed easily.

The raised portion 30 is formed by subjecting the lateral surface portion 28 of the rim 12 to a cutting operation, and the recessed portions 31, each being formed between two adjacent raised portions 30, are cut surfaces formed by the cutting operation.

Through the foregoing configuration, the raised portion 30 can easily be formed by the cutting operation and a surface giving an upscale looking of the cut surface can be provided on the lateral surface portion 28 of the rim 12.

Additionally, the outer lateral surface 30a as the end face in the height direction of the raised portion 30 is subjected to surface treatment resulting in an appearance different from an appearance resulting from surface treatment applied to each of the recessed portions 31 formed between two adjacent raised portions 30.

Through the foregoing configuration, the surface treatment applied to the raised portion 30 can enhance appearance of the spoke wheel 10.

Additionally, the spoke wheel 10 is a tubeless wheel including the air valve 23, the rim 12 is a metal extruded stock formed into a circular ring shape, the rim 12 has the valve hole 34, in which the air valve 23 is fixed, and the valve hole 34 is disposed in the shouldered portion 33, which is formed by pressworking in a part of the rim 12 in the circumferential direction.

Through the foregoing configuration, because the air valve 23 is fixed to the shouldered portion 33, which is formed in the circumferential direction of the rim 12 by pressworking in a part of the rim 12, formed of the extruded stock, the shouldered portion 33 can be small in the circumferential direction of the rim 12 and the rim 12 can be reduced in weight.

Second Embodiment

A second embodiment to which the present invention is applied will be described below with reference to FIG. 7. In the second embodiment, like or corresponding parts are identified by the same reference symbols as those used in the first embodiment and descriptions for those parts will be omitted.

While the outer lateral surface 30a of the raised portion 30 in the first embodiment has been described as being a rectangle extending in the radial direction of the rim 12 in the side view, a raised portion 30 in the second embodiment differs in shape from the raised portion 30 in the first embodiment.

Figure 7:
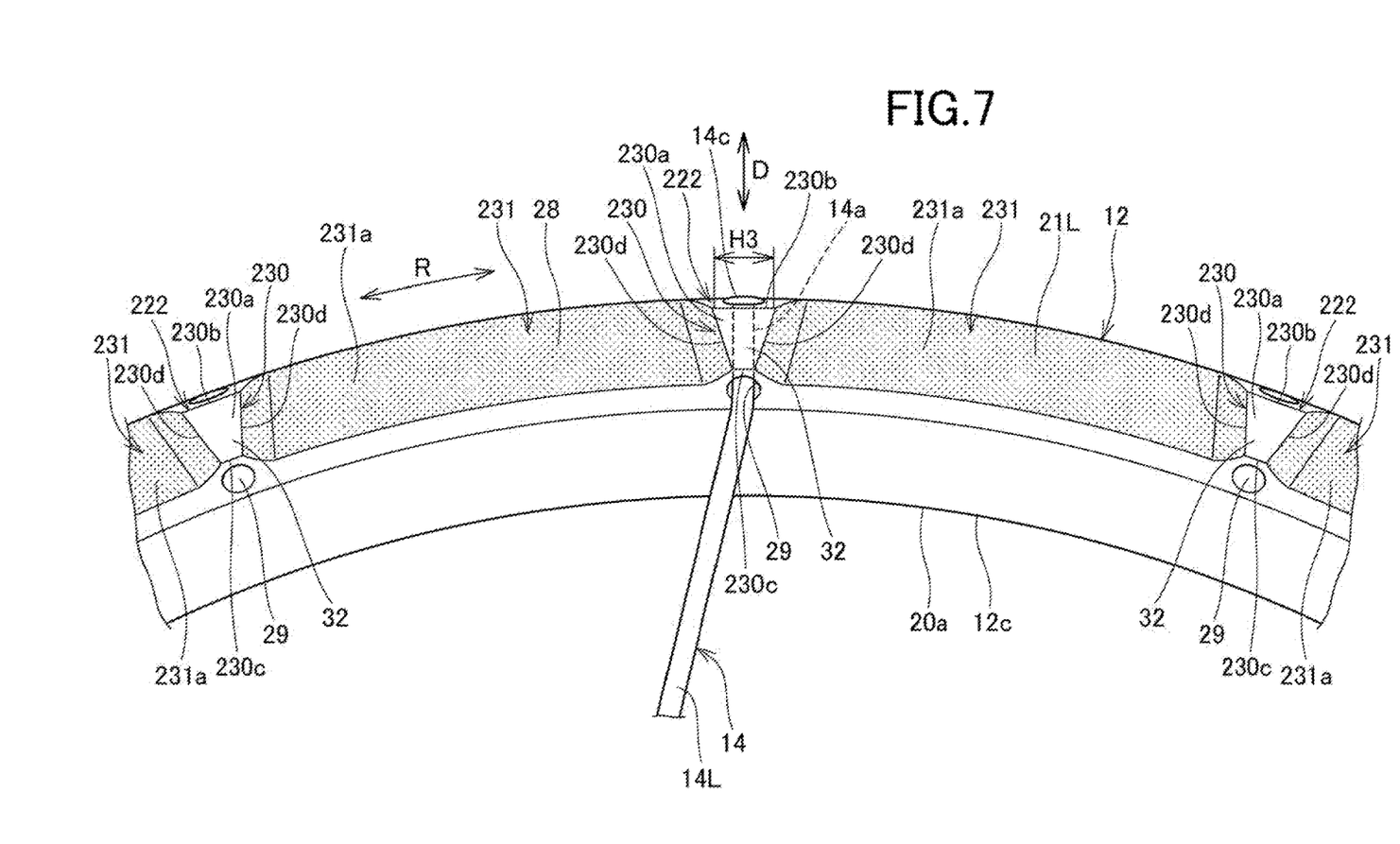
FIG. 7 is a side elevational view of a spoke and a connection portion in a rim in a second embodiment.

FIG. 7 is a side elevational view of a spoke 14 and a connection portion 222 in a rim 12 in the second embodiment.

In the second embodiment, the rim 12 includes the connection portion 222 in place of the connection portion 22.

The connection portion 222, with which the spoke 14 is connected, has a support hole 29 and a raised portion 230, which is raised from the connection portion 222 to the outside in the width direction of the rim 12. The raised portion 230 is provided in plurality and the raised portions 230 are disposed radially about a hub 13.

A recessed portion 231, which is recessed in the width direction of the rim 12, is formed in a portion of a lateral surface portion 28 of the rim 12 between two adjacent raised portions 230. The recessed portion 231 and the raised portion 230 are formed by cutting.

As with the bottom surface 31a depicted in FIG. 5 of the first embodiment, a bottom surface 231a of the recessed portion 231 is disposed outside the support hole 29 in the width direction of the rim 12 and, in a depth direction of the recessed portion 231, the recessed portion 231 does not overlap the support hole 29.

An outer lateral surface 230a, as an end face in the height direction of the raised portion 230, is a quadrilateral in the side view of FIG. 7. More specifically, the outer lateral surface 230a is, in a side view, an isosceles trapezoid having a first base 230b (a side on the outside in the radial direction) and a second base 230c (a side on the inside in the radial direction), which face each other, and a pair of legs 230d, which connects the first base 230b with the second base 230c.

In the raised portion 230, the first base 230b and the second base 230c are oriented in a direction orthogonal to the radial direction of the rim 12.

The first base 230b is longer in length than the second base 230c and disposed on the outside in the radial direction with respect to the second base 230c. Specifically, the raised portion 230 is formed such that, in the side view, a width H3 of the raised portion 230 increases toward the first base 230b relative to the second base 230c.

A flange portion 14c of the spoke 14 fitted in the support hole 29 is borne by a surface in the raised portion 230 on the side of the first base 230b. This configuration allows the flange portion 14c to be borne by the side having a greater width H3 in the raised portion 230, so that the spoke 14 can be supported by the raised portion 230 with greater stiffness.

Additionally, the raised portion 230 tapers toward the second base 230c relative to the first base 230b, so that the raised portion 230 can be reduced in weight and the rim 12 can be reduced in weight.

According to the second embodiment, the quadrilateral raised portion 230 is an isosceles trapezoid, in which the first base 230b as the side on the outside in the radial direction of the rim 12 is longer in length than the second base 230c as the side on the inside in the radial direction of the rim 12.

Through the foregoing configuration, the rim 12 can efficiently be reduced in weight, while stiffness of the rim 12 is ensured.

Third Embodiment

A third embodiment to which the present invention is applied will be described below with reference to FIG. 8. In the third embodiment, like or corresponding parts are identified by the same reference symbols as those used in the first embodiment and descriptions for those parts will be omitted.

The third embodiment differs from the first embodiment in that the third embodiment includes a circular ring-shaped connection wall portion 340, which connects a plurality of raised portions in the circumferential direction of the rim.

Figure 8:
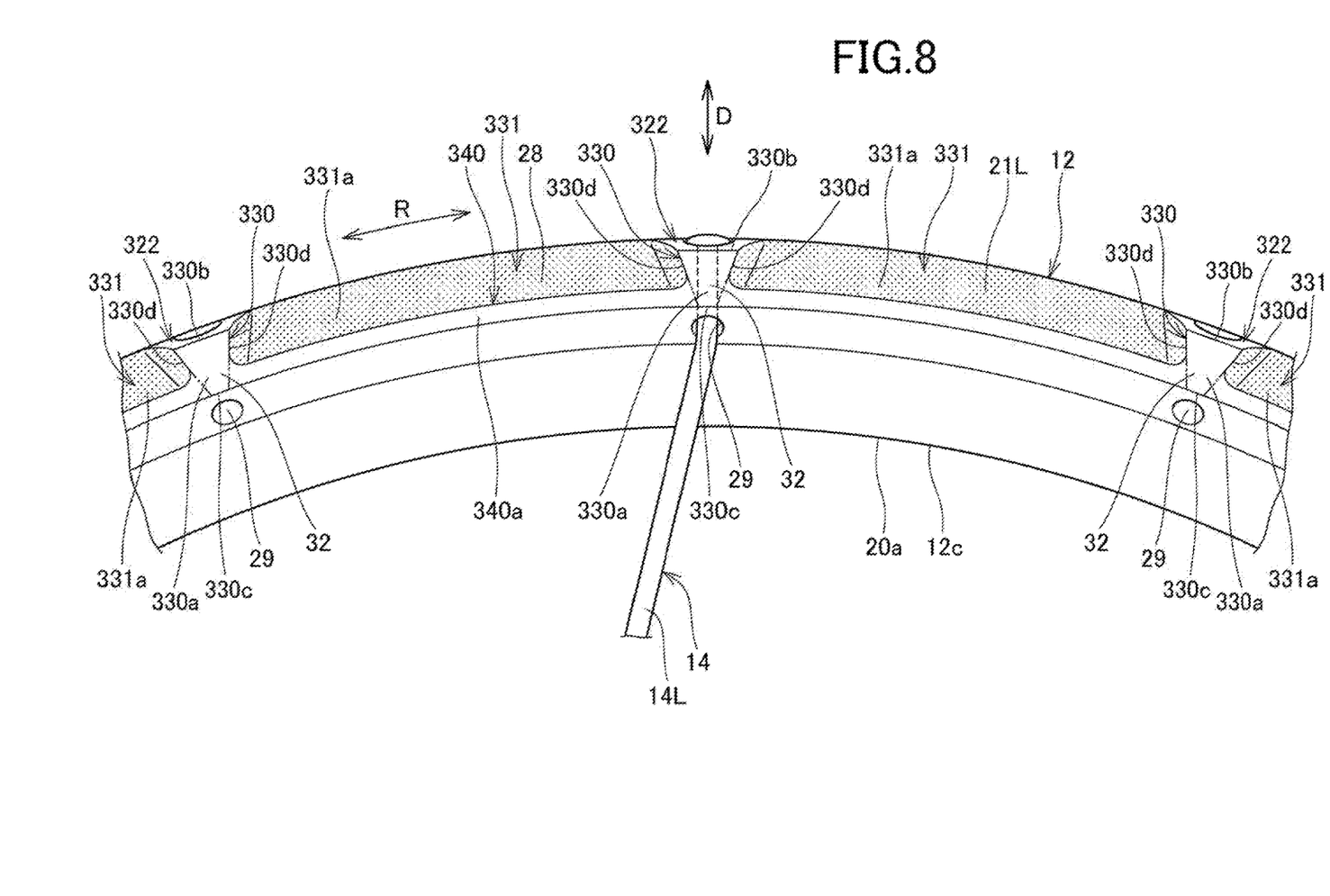
FIG. 8 is a side elevational view of a spoke and a connection portion in a rim in a third embodiment.

FIG. 8 is a side elevational view of a spoke 14 and a connection portion 322 in a rim 12 in the third embodiment.

In the third embodiment, the rim 12 includes a connection portion 322 in place of the connection portion 22.

The connection portion 322, with which the spoke 14 is connected, has a support hole 29 and a raised portion 330, which is raised from the connection portion 322 to the outside in the width direction of the rim 12. The raised portion 330 is provided in plurality and the raised portions 330 are disposed radially about a hub 13.

As with the second embodiment, the raised portion 330 is, in a side view, an isosceles trapezoid having a first base 330b and a second base 330c, which face each other, and a pair of legs 330d, which connects the first base 330b (a side on the outside in the radial direction) with the second base 330c (a side on the inside in the radial direction).

The connection wall portion 340 is disposed on a lateral surface portion 28. The connection wall portion 340 has a circular ring shape and connects the raised portions 330 in the circumferential direction of the rim 12.

The connection wall portion 340 connects together end portions of the raised portion 330 on the side of the second base 330c in the circumferential direction of the rim 12.

The connection wall portion 340 is formed so as to connect together all of the raised portions 330 in the circumferential direction and thus has a circular ring shape circling around the lateral surface portion 28. It is noted that the connection wall portion 340 is only required to be generally annular and may have a part discontinued in the circumferential direction.

An operator may be able to determine runout of the rim 12 using a change in a dimension of an entire periphery of the connection wall portion 340 measured with a gauge in contact with the connection wall portion 340. Even with the raised portions 330 provided, providing the connection wall portion 340 enables runout of the rim 12 to be measured easily. The connection wall portion 340 also enhances stiffness of the rim 12.

An end face 340a of the connection wall portion 340 in the height direction is flush with an outer lateral surface 330a, which constitutes an end face of the raised portion 330 in the height direction, and the end face 340a is continuous with the outer lateral surface 330a. Thus, the raised portion 330 is not likely to hamper measurement of the runout of the rim 12. Specifically, the runout can easily be measured and the raised portion 330 and the connection wall portion 340 can be formed easily.

A recessed portion 331, which is recessed in the width direction of the rim 12, is formed in a portion of the lateral surface portion 28 of the rim 12 between two adjacent raised portions 330 and outside the connection wall portion 340 in the radial direction. The recessed portion 331, the raised portion 330, and the connection wall portion 340 are formed by cutting.

As with the bottom surface 31a depicted in FIG. 5 of the first embodiment, a bottom surface 331a of the recessed portion 331 is disposed outside the support hole 29 in the width direction of the rim 12 and, in a depth direction of the recessed portion 331, the recessed portion 331 does not overlap the support hole 29.

The connection wall portion 340 extends along the recessed portion 331 in the circumferential direction of the rim 12.

According to the third embodiment, the circular ring-shaped connection wall portion 340 connects together the raised portions 330 in the circumferential direction of the rim 12 and the connection wall portion 340 extends along the recessed portion 331 formed between two adjacent raised portions 330.

Through the foregoing configuration, the connection wall portion 340 can enhance stiffness of the rim 12.

The connection wall portion 340 is flush with the raised portion 330 in the height direction of the raised portion 330.

Through the foregoing configuration, the raised portion 330 and the connection wall portion 340 can be formed easily and, even with a configuration including the raised portion 330, the connection wall portion 340 can be used to easily measure runout of the rim 12.

While the third embodiment has been described as including the raised portion 330, which is an isosceles trapezoid, the shape of the raised portion 330 is not necessarily limited to the isosceles trapezoid. The raised portion may be, for example, a rectangle as in the first embodiment.

Additionally, the connection wall portion is only required to connect together parts of the raised portions 330 in the radial direction in the circumferential direction of the rim 12. For example, the connection wall portion may connect together end portions in the raised portions 330 on the sides of the first bases 330b in the circumferential direction of the rim 12.

Fourth Embodiment

A fourth embodiment to which the present invention is applied will be described below with reference to FIG. 9. In the fourth embodiment, like or corresponding parts are identified by the same reference symbols as those used in the first embodiment and descriptions for those parts will be omitted.

The fourth embodiment differs from the first embodiment in that a recessed portion 431 is deeper than the recessed portion 31.

Figure 9:
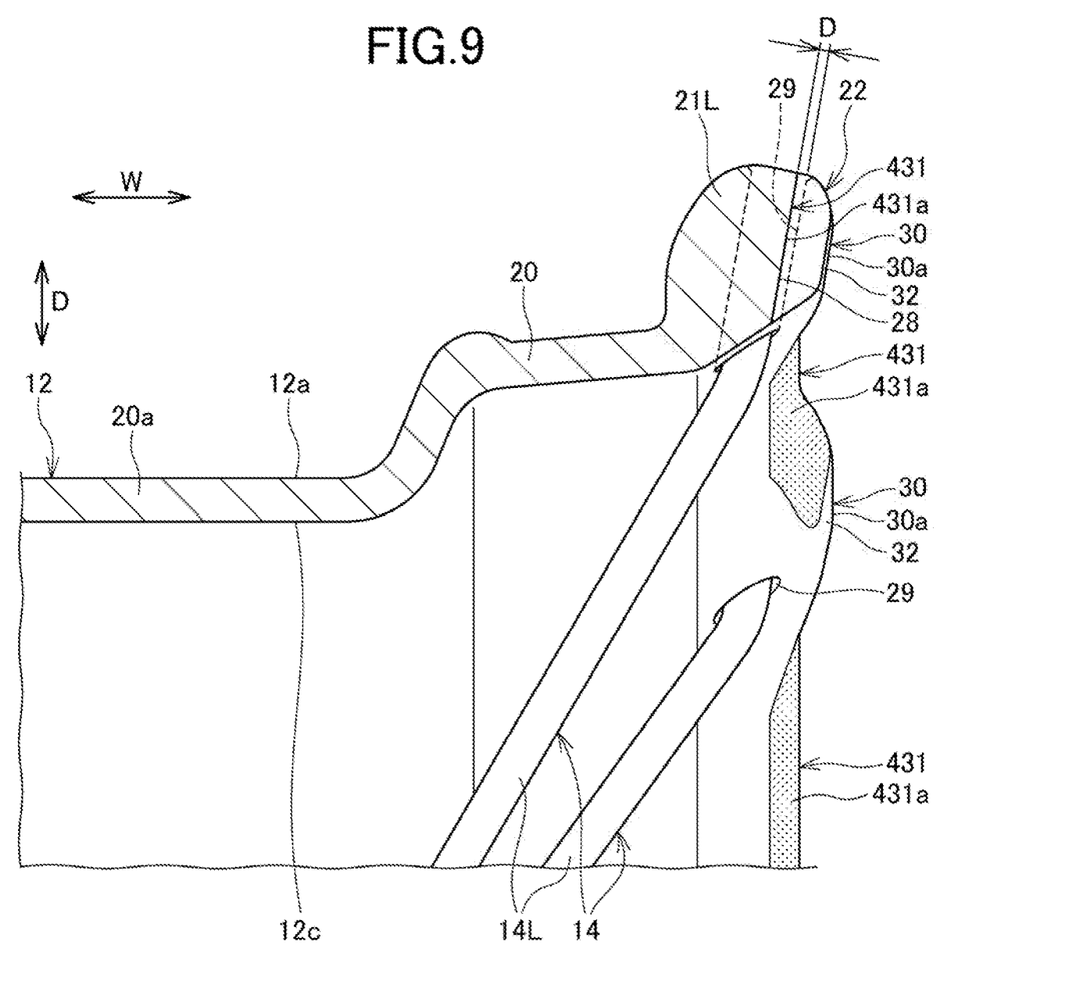
FIG. 9 is an illustration of a fourth embodiment, corresponding to the cross-sectional view taken along V-V in FIG. 1.

FIG. 9 is an illustration of a fourth embodiment, corresponding to the cross-sectional view taken along V-V in FIG. 1.

The recessed portion 431, which is recessed in a width direction of a rim 12, is formed by cutting in portions of a lateral surface portion 28 between each pair of adjacent raised portions 30.

The recessed portion 431 has a bottom surface 431a disposed inside a support hole 29 in the width direction of the rim 12. The recessed portion 431 overlaps the support hole 29 by a depth D in the depth direction of the recessed portion 431.

According to the fourth embodiment, a first end portion 14a of a spoke 14 fits in the support hole 29, which extends in the radial direction of the rim 12 at a connection portion 22, and the recessed portion 431 formed between two adjacent raised portions 30 overlaps at least partly the support hole 29 in the depth direction of the recessed portion 431.

Through the foregoing configuration, the recessed portion 431 has a depth with which the recessed portion 431 overlaps the support hole 29, in which the first end portion 14a of the spoke 14 fits, so that the recessed portion 431 can effectively reduce weight of the rim 12.

It is noted that, also in the configurations of the second and third embodiments, the recessed portions 231 and 331 may each have a depth with which each overlaps the support hole 29.

The first to fourth embodiments described above are illustrative only and not limiting.

Although the spoke wheel 10 of a motorcycle has been exemplified in the first to fourth embodiments, the present invention is not limited thereto and may be applied to a spoke wheel of a three-wheeled or four-or-more-wheeled vehicle including two front or rear wheels.

DESCRIPTION OF REFERENCE SYMBOLS

10 Spoke wheel
12 Rim
13 Hub
14 Spoke
14a First end portion (end portion)
22, 222, 322 Connection portion
23 Air valve
28 Lateral surface portion
29 Support hole
30, 230, 330 Raised portion
30a, 230a, 330a Outer lateral surface (end face in the height direction)
31, 231, 331, 431 Recessed portion
33 Shouldered portion
34 Valve hole
230b Base (side on the outside in the radial direction)
230c Base (side on the inside in the radial direction)
340 Connection wall portion

The invention claimed is:

1. A spoke wheel comprising:
a rim;
a hub; and
a plurality of spokes connecting the rim with the hub, wherein
the hub has an axle hole, through which an axle of a vehicle is passed when in use,
the rim includes a bottom wall portion and a flange portion, the bottom wall portion has a circular ring shape surrounding the hub from a periphery of the hub along the axle, the flange portion rises to an outside in a radial direction of the rim from a lateral edge in a width direction of the bottom wall portion, the width direction is a direction along the axle,
the spokes each having an end portion connected with a connection portion disposed at a lateral surface portion of the flange portion disposed on an outside of the flange portion in the width direction,
the lateral surface portion of the flange portion inclines such that the lateral surface portion is disposed further outside in the width direction toward the outside in the radial direction of the rim,
the connection portion is positioned outside in the width direction with respect to a lateral wall portion, in the width direction, of a tire in a state in which the tire is supported by the spoke wheel, and
the rim includes a raised portion, on the lateral surface portion of the flange portion, that is raised from the connection portion to the outside in the width direction.

2. The spoke wheel according to claim 1, wherein
a plurality of the raised portion is disposed radially about the hub.

3. The spoke wheel according to claim 2, wherein
each of the plurality of the raised portion is a quadrilateral in a side view.

4. The spoke wheel according to claim 3, wherein
each of the plurality of the raised portion is an isosceles trapezoid having, in the quadrilateral, a side on an outside in the radial direction of the rim longer in length than a side on an inside in the radial direction of the rim.

5. The spoke wheel according to claim 2, wherein
the rim includes a circular ring-shaped connection wall portion connecting together each of the plurality of the raised portion in a circumferential direction of the rim, and
the connection wall portion extends along recessed portions each being formed between each of a corresponding pair of adjacent raised portions, of the plurality of the raised portion.

6. The spoke wheel according to claim 5, wherein
the connection wall portion is flush with each of the plurality of the raised portion in a height direction of the plurality of the raised portion.

7. The spoke wheel according to claim 2, wherein
each of the plurality of the raised portion is formed by subjecting the lateral surface portion of the rim to a cutting operation, and
recessed portions, each being formed between each of a corresponding pair of adjacent raised portions, of the plurality of the raised portion, are cut surfaces formed by the cutting operation.

8. The spoke wheel according to claim 2, wherein
an end face in a height direction of each of the plurality of the raised portion is subjected to surface treatment resulting in an appearance different from an appearance resulting from surface treatment applied to each of recessed portions formed between each of a corresponding pair of adjacent raised portions, of the plurality of the raised portion.

9. The spoke wheel according to claim 1, wherein
the spoke wheel is a tubeless wheel including an air valve,
the rim is metal extruded stock formed into a circular ring shape,
the rim has a valve hole in which the air valve is fixed, and
the valve hole is disposed in a shouldered portion formed by pressing in a part of the rim in the circumferential direction of the rim.

10. The spoke wheel according to claim 2, wherein
the spokes each have the end portion fitting in a support hole extending in the radial direction of the rim at the connection portion, and
recessed portions each formed between each of a corresponding pair of adjacent raised portions, of the plurality of the raised portion, overlaps at least partly the support hole in a depth direction of the recessed portions.

11. A spoke wheel comprising:
a rim;
a hub; and
a plurality of spokes connecting the rim with the hub, wherein
the hub has an axle hole, through which an axle of a vehicle is passed when in use,
the rim includes a bottom wall portion and a flange portion, the bottom wall portion has a circular ring shape surrounding the hub from a periphery along the axle, the flange portion rises to an outside in a radial direction of the rim from a lateral edge in a width direction of the bottom wall portion, the width direction is a direction along the axle,
the spokes each having an end portion connected with a connection portion disposed at a lateral surface portion of the flange portion on an outside of the flange portion in the width direction,
the lateral surface portion of the flange portion inclines such that the lateral surface portion is disposed further outside in the width direction toward the outside in the radial direction of the rim,
the connection portion is positioned outside in the width direction with respect to a lateral wall portion, in the width direction, of a tire in a state in which the tire is supported by the spoke wheel,
the rim includes a plurality of raised portions disposed radially about the hub, each of the plurality of raised portions is disposed on the lateral surface portion of the flange portion, and is raised from the connection portion to the outside in the width direction,
the rim includes a circular ring-shaped connection wall portion connecting together each of the plurality of raised portions in a circumferential direction of the rim,
the connection wall portion extends along recessed portions each being formed between each of a corresponding pair of adjacent raised portions, of the plurality of raised portions, and
the connection wall portion is flush with each of the plurality of raised portions in a height direction of the plurality of raised portions.

* * * * *